(12) United States Patent
Takeda

(10) Patent No.: US 12,275,295 B2
(45) Date of Patent: Apr. 15, 2025

(54) VEHICLE DRIVE APPARATUS

(71) Applicant: Daimler AG, Stuttgart (DE)

(72) Inventor: Shogo Takeda, Kawasaki (JP)

( * ) Notice: Subject to any disclaimer, the term of this patent is extended or adjusted under 35 U.S.C. 154(b) by 193 days.

(21) Appl. No.: 17/783,550

(22) PCT Filed: Oct. 22, 2020

(86) PCT No.: PCT/JP2020/039668
§ 371 (c)(1),
(2) Date: Jun. 8, 2022

(87) PCT Pub. No.: WO2021/124675
PCT Pub. Date: Jun. 24, 2021

(65) Prior Publication Data
US 2023/0018057 A1    Jan. 19, 2023

(30) Foreign Application Priority Data
Dec. 19, 2019 (JP) .................. 2019-229733

(51) Int. Cl.
*B60K 1/00* (2006.01)
*B60K 17/16* (2006.01)

(52) U.S. Cl.
CPC ............ *B60K 1/00* (2013.01); *B60K 17/16* (2013.01); *B60K 2001/001* (2013.01)

(58) Field of Classification Search
CPC ..... B60K 1/00; B60K 17/16; B60K 2001/001
See application file for complete search history.

(56) References Cited

U.S. PATENT DOCUMENTS

| 6,382,341 B1 | 5/2002 | Hashimoto et al. |
| 9,692,277 B2 | 6/2017 | Pearce, Jr. et al. |

(Continued)

FOREIGN PATENT DOCUMENTS

| JP | 2018-16126 A | 2/2018 |
| JP | 2019-189169 A | 10/2019 |

(Continued)

OTHER PUBLICATIONS

English-language European Search Report issued in European application No. 20902567.5-1012 dated May 16, 2023 (Eight (8) pages).

(Continued)

*Primary Examiner* — Erez Gurari
(74) *Attorney, Agent, or Firm* — Crowell & Moring LLP

(57) ABSTRACT

A vehicle drive apparatus having a drive unit where the drive unit includes a motor that generates a driving force in a vehicle with a ladder frame, a transmission that changes the driving force transmitted from the motor, and a differential that splits the driving force transmitted from the transmission and transmits forces split to driving wheels of the vehicle. The vehicle drive apparatus includes a drive unit housing that houses at least part of the drive unit, a motor-side support coupling the drive unit housing to the ladder frame by two couplers arranged in a motor-side end region of the drive unit housing, and a differential-side support coupling the drive unit housing to the ladder frame in a differential-side end region of the drive unit housing. The two couplers of the motor-side support are arranged father outside in a vehicle width direction than the differential-side support.

4 Claims, 9 Drawing Sheets

(56) References Cited

U.S. PATENT DOCUMENTS

| | | | | |
|---|---|---|---|---|
| 2002/0179350 A1* | 12/2002 | Li | | B60K 6/36 |
| | | | | 903/909 |
| 2013/0206496 A1* | 8/2013 | Hashimoto | | B62D 21/12 |
| | | | | 180/291 |
| 2016/0159221 A1* | 6/2016 | Chen | | B62D 31/025 |
| | | | | 180/53.8 |
| 2016/0207386 A1* | 7/2016 | Nagaosa | | B60K 1/04 |
| 2018/0022387 A1* | 1/2018 | Ta | | B60L 50/66 |
| | | | | 180/291 |
| 2018/0170344 A1* | 6/2018 | Laine | | B60K 6/52 |
| 2018/0201249 A1* | 7/2018 | Belloso | | B60W 20/10 |
| 2019/0263245 A1* | 8/2019 | Chi-Hsueh | | H02K 7/083 |
| 2019/0344650 A1* | 11/2019 | Suumen | | B60K 1/00 |
| 2020/0127527 A1* | 4/2020 | Nakamatsu | | H02K 7/116 |
| 2020/0156454 A1* | 5/2020 | Yaguchi | | B60K 6/405 |
| 2020/0238814 A1* | 7/2020 | Kodama | | B60K 5/1208 |
| 2020/0403482 A1* | 12/2020 | Luo | | H02K 9/193 |
| 2021/0146765 A1 | 5/2021 | Menon et al. | | |
| 2021/0178878 A1* | 6/2021 | Hendricks | | B60K 1/00 |
| 2022/0016970 A1* | 1/2022 | Ellis | | B60K 7/0007 |
| 2022/0194489 A1* | 6/2022 | Roche | | B60K 17/22 |
| 2022/0396141 A1* | 12/2022 | Xiang | | B60K 11/02 |
| 2023/0018057 A1* | 1/2023 | Takeda | | B60K 17/04 |
| 2024/0075796 A1* | 3/2024 | Charbonneau | | B60G 3/00 |
| 2024/0149667 A1* | 5/2024 | Van Maanen | | B60K 17/16 |

FOREIGN PATENT DOCUMENTS

| | | |
|---|---|---|
| JP | 2019-189171 A | 10/2019 |
| WO | WO 2013/069774 A1 | 5/2013 |
| WO | WO 2014/148410 A1 | 9/2014 |
| WO | WO 2019/044262 A1 | 3/2019 |

OTHER PUBLICATIONS

PCT/JP2020/039668, International Search Report dated Dec. 1, 2020 (Two (2) pages).

Chinese-language Office Action issued in Chinese Application No. 202080088459.5 dated Jan. 24, 2025, with English translation (21 pages).

\* cited by examiner

VEHICLE DRIVE APPARATUS

TECHNICAL FIELD

The present invention relates to a vehicle drive apparatus.

BACKGROUND ART

From the viewpoint of reducing environmental impact, electric trucks driven solely by electric motors without internal combustion have recently been developed in the field of commercial vehicles such as trucks. Such electric vehicles each include a drive unit that includes, for example, a motor and a power transmission mechanism such as a speed reducer composed of a plurality of gears, and can transmit a driving force of the motor to a differential gear to which driving wheels are coupled (Patent Document 1).

CITATION LIST

Patent Document

Patent Document 1: International Patent Publication No. 2014/148410

SUMMARY OF THE INVENTION

Technical Problem

When such a drive unit is mounted on an electric vehicle such as a commercial vehicle, the drive unit is supported by a ladder frame and a cross member.

Unfortunately, for the electric trucks, driving torque generated by the motor is larger than that of passenger cars, thereby causing large torque reaction to occur in the drive unit during driving of the motor. Thus, a vehicle drive apparatus such as a bracket needs to have higher reliability, which may lead to increase in size and weight of a support device.

Additionally, in the case of the electric trucks, the drive unit itself has a size and a weight that are larger than those of the passenger cars. Thus, a larger moment is produced in the drive unit during vehicle is rolling or pitching. In such a vehicle drive apparatus, the stability of the drive unit during vehicle rolling or pitching needs to be improved.

The present invention has been achieved to solve at least some of such problems, and it is an object thereof to provide a vehicle drive apparatus capable of improving the stability of a drive unit during vehicle rolling or the like while reducing the risk of increase in size and weight of a support device.

Solution to the Problem (1) A vehicle drive apparatus according to an application example includes a drive unit including a motor that generates a driving force in a vehicle with a ladder frame, a transmission that changes the driving force transmitted from the motor, and a differential that splits the driving force transmitted from the transmission and transmits the split forces to driving wheels of the vehicle, the vehicle drive apparatus further including: a drive unit housing at least partly housing the drive unit; a motor-side support coupling the drive unit housing to the ladder frame by two couplers arranged in a motor-side end region of the drive unit housing; and a differential-side support coupling the drive unit housing to the ladder frame in a differential-side end region of the drive unit housing. The two couplers of the motor-side support are arranged on outer side in a vehicle width direction than the differential-side support.

The vehicle drive apparatus according to the above-described application example can employ a configuration in which the two couplers of the motor-side support are arranged on the outer side in the vehicle width direction than respective couplers serving as the differential-side support. As compared to a vehicle drive apparatus without such a configuration, the two couplers are arranged farther from the center of rolling that is the center of gravity of the drive unit as compared to a vehicle drive apparatus without such a configuration. Thus, it is possible to make the couplers receive a smaller moment during rolling of the drive unit. This makes it possible to reduce the requirement of rigidity on the couplers, thereby enabling the drive unit to be supported on the ladder frame while reducing increase in size and weight of the couplers, which are support devices. Consequently, the stability of the drive unit during rolling of the vehicle can be improved.

(2) In the vehicle drive apparatus according to the present application example, in (1) above, a virtual line connecting the two couplers of the motor-side support may be parallel to the vehicle width direction. That is, the two couplers of the motor-side support are arranged at the same positions with respect to a vehicle front-and-rear direction, and thus receive equal forces. This makes it possible to reduce the requirement of rigidity on the two couplers, thereby reducing increase in size and weight of the couplers to be reduced.

(3) In the vehicle drive apparatus according to the present application example, in (1) or (2) above, the differential-side support may couple the drive unit housing to the ladder frame by two couplers arranged in the differential-side end region of the drive unit housing. As compared to when only one coupler is employed, employing the two couplers serving as the differential-side support can reduce stress concentration, thereby making it possible to reduce the requirement of rigidity on the couplers, and to reduce increase in size and weight of the couplers to be reduced.

(4) In the vehicle drive apparatus according to the present application example, in (3) above, the two couplers of the motor-side support and the two couplers of the differential-side support may be arranged such that a virtual line connecting the two couplers of the motor-side support and the two couplers of the differential-side support forms a trapezoid that is line symmetric in the vehicle width direction with the line between the two couplers of the motor-side support being a lower base in plan view from above the vehicle.

Arranging the four couplers, i.e., the couplers of the motor-side support and the couplers of the differential-side support such that the virtual line connecting the four couplers forms the trapezoid in plan view from above the vehicle as described above can improve the roll performance of the entire vehicle. To be more specific, the roll axial centers of the drive apparatus and the vehicle, which are mass bodies independent of each other, need to correspond to each other as much as possible in order to improve the roll performance of the entire vehicle. Arranging the two couplers of the motor-side support and the two couplers of the differential-side support so as to form the trapezoid that is line symmetric in the vehicle width direction allows the roll axial centers of the drive apparatus and the vehicle to easily correspond to each other, and the roll performance of the entire vehicle to be improved.

(5) In the vehicle drive apparatus according to the present application example, in any one of (1) to (4) above, the motor-side support may be arranged at a lower position in a vehicle height direction than the differential-side support. In such a configuration, an axis connecting the motor-side support and the differential-side support passes through the inside of the drive unit housing. This allows the couplers of the motor-side support to have lower rigidity, and thereby enables the drive unit to be supported on the ladder frame while reducing the increase in size and weight of the couplers serving as the support device. Consequently, the stability of the drive unit during rolling of the vehicle can be improved.

(6) In the vehicle drive apparatus according to the present application example, in any one of (1) to (4) above, the motor-side support may be arranged at a higher position in a vehicle height direction than the differential-side support. In such a configuration, an axis connecting the motor-side support and the differential-side support passes through the inside of the drive unit housing. This allows the couplers of the motor-side support to have lower rigidity, and thereby enables the drive unit to be supported on the ladder frame while reducing the increase in size and weight of the couplers serving as the support device. Consequently, the stability of the drive unit during rolling of the vehicle can be improved.

DESCRIPTION OF EMBODIMENT

Configurations of embodiments of the present invention will be described in detail below with reference to the drawings.

Configuration of Embodiment

Figure 1:
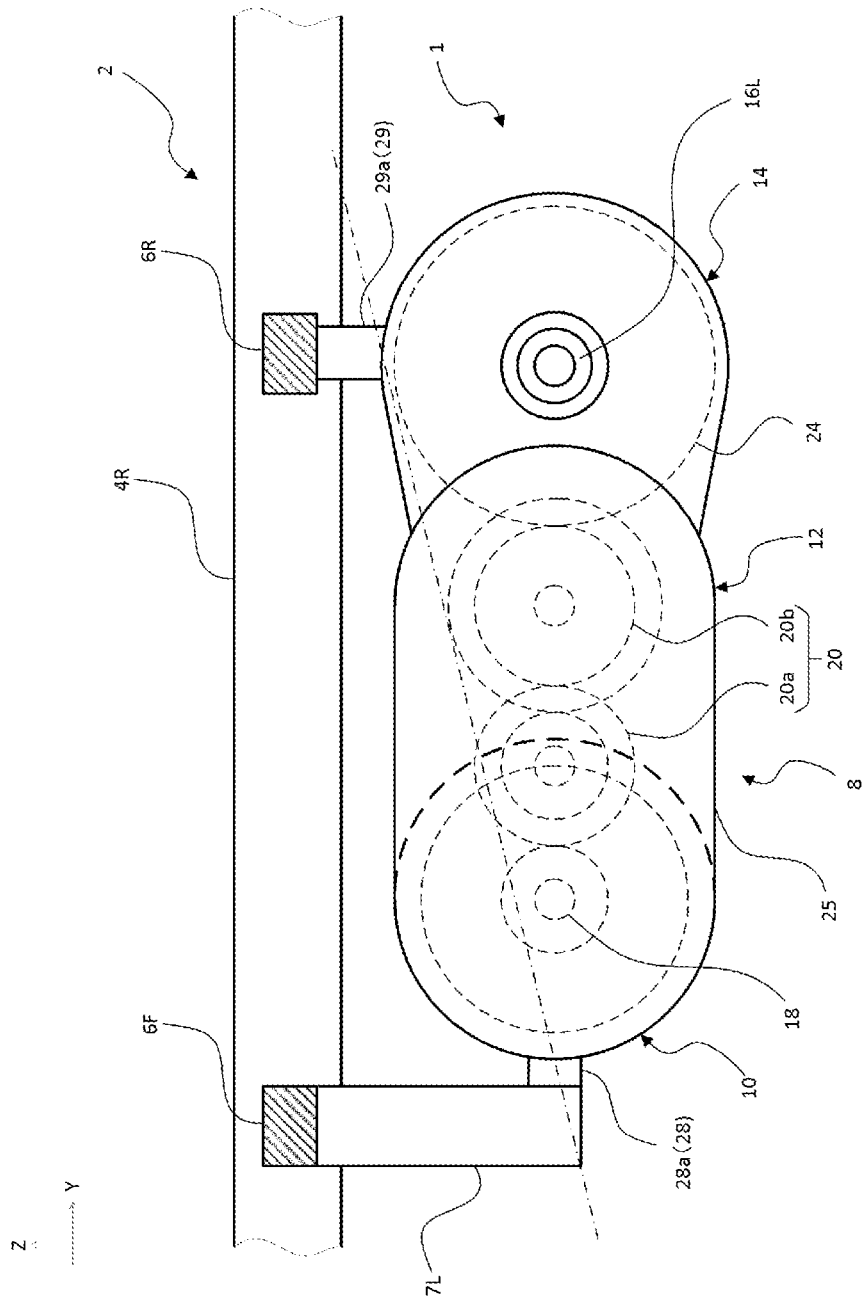
FIG. 1 is a view schematically illustrating a vehicle drive apparatus of an embodiment of the present invention viewed from the side of a vehicle.
Figure 2:
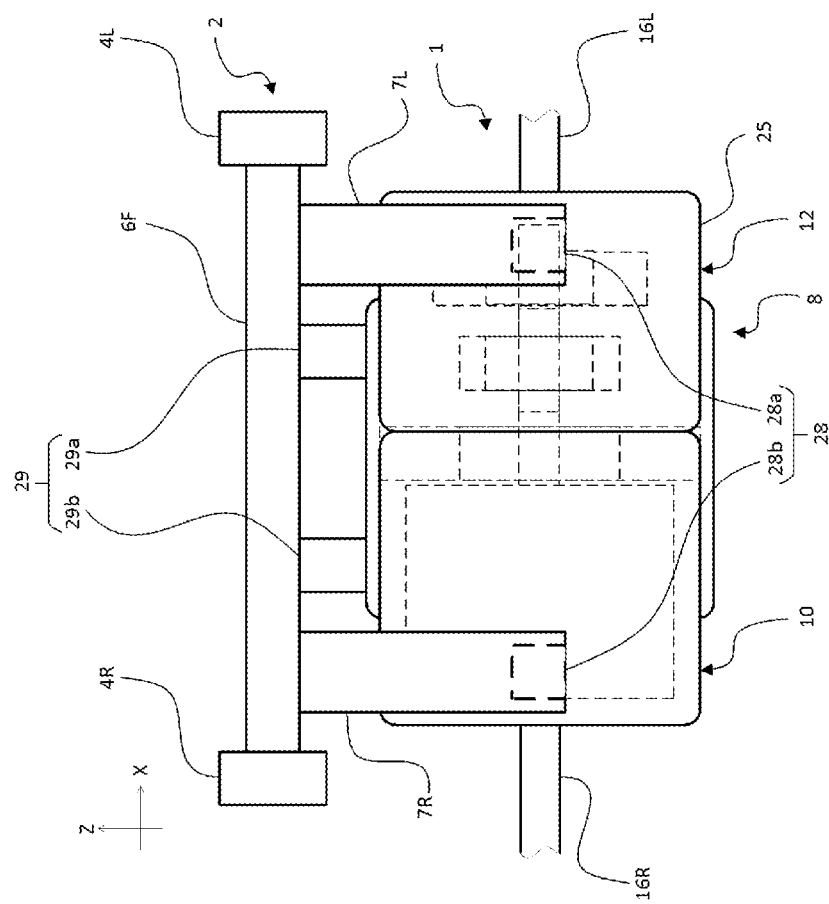
FIG. 2 is a view illustrating the vehicle drive apparatus of FIG. 1 viewed from the front of the vehicle.
Figure 3:
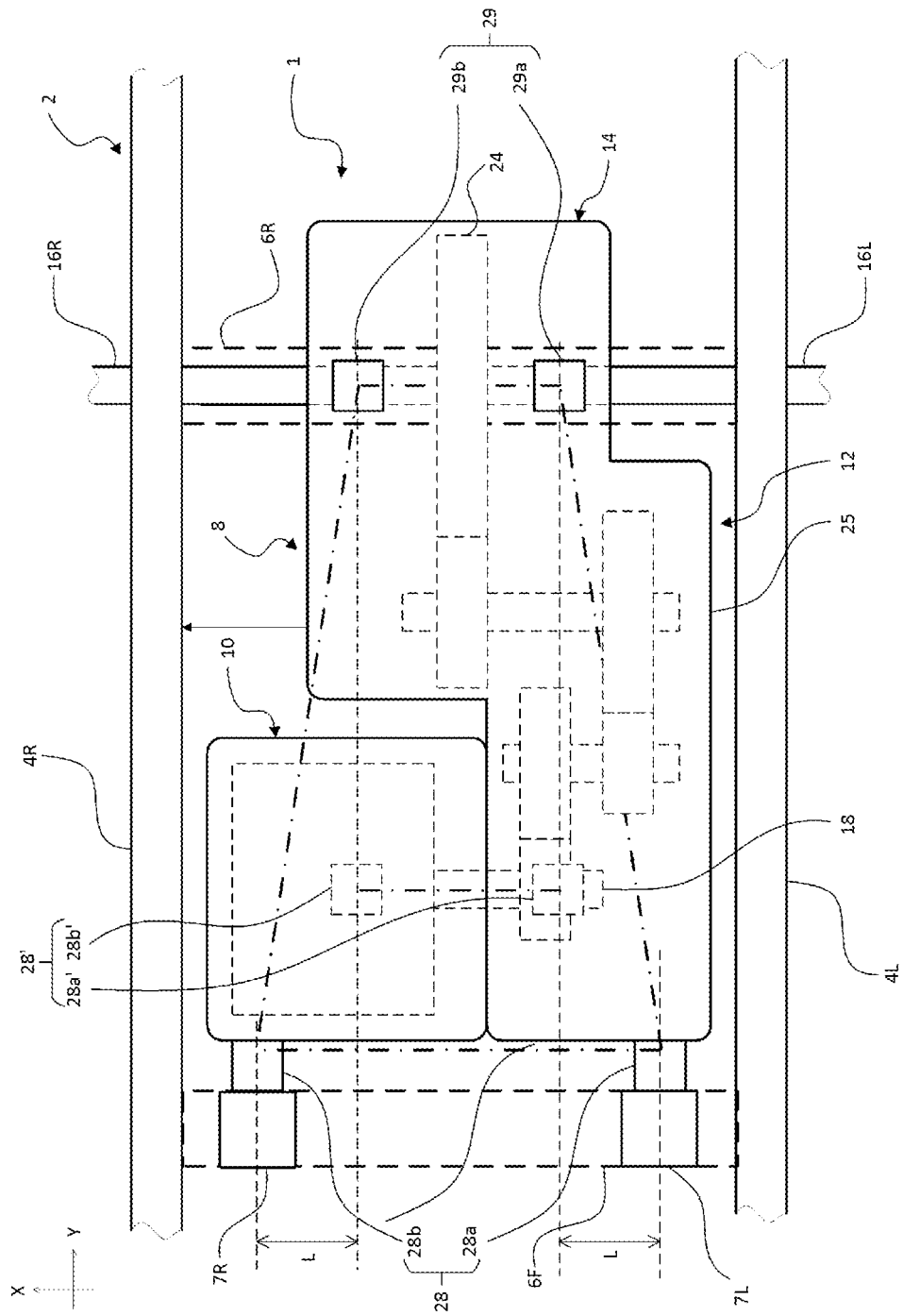
FIG. 3 is a view illustrating the vehicle drive apparatus of FIG. 1 viewed from above the vehicle.

The outline of a vehicle drive apparatus 1 of an embodiment of the present invention will be described below with reference to FIGS. 1 to 3. FIG. 1 is a view schematically illustrating the vehicle drive apparatus 1 according to the embodiment of the present invention viewed from the side of a vehicle. For convenience of explanation of features, FIG. 1 employs a viewpoint illustrating, of a pair of side rails 4L and 4R described later, only a side rail 4R located on the back side in lateral view. FIG. 2 is a view illustrating the vehicle drive apparatus 1 viewed from the front of the vehicle. FIG. 3 is a view illustrating the vehicle drive apparatus 1 viewed from above the vehicle.

The vehicle using the vehicle drive apparatus 1 is, for example, an electric truck having a motor as a driving source for travel. For example, a cab and a platform, which are not illustrated, are mounted on a ladder frame 2. The ladder frame 2 includes the paired left and right side rails 4L and 4R extending in a vehicle front-and-rear direction Y, and a plurality of cross members 6F and 6R arranged between the side rails 4L and 4R.

The paired side rails 4L and 4R are arranged with a predetermined distance therebetween in a vehicle width direction X. The cross members 6F and 6R extend in the vehicle width direction X. Both ends of each cross member 6F or 6R are connected to the respective side rails 4L and 4R. The plurality of the cross members 6F and 6R are arranged with a predetermined distance therebetween in the vehicle front-and-rear direction Y. A drive unit 8 of the vehicle is arranged below the ladder frame 2.

The cross members 6 may have any shape as far as they can support the drive unit 8 via couplers 28a, 28b, 29a, and 29b described later.

The drive unit 8 includes a motor 10 that is a driving source for travel of the vehicle, a transmission 20 housed in a gearbox 12 connected to the motor 10, and a differential device (differential) 14 connected to the transmission 20. The motor 10 is driven by electric power supplied from an unillustrated battery mounted on the vehicle, thereby generating a driving force.

A pair of drive shafts 16L and 16R are coupled to the differential device 14. The transmission 20 includes a plurality of gears 20a and 20b. A rotary shaft 18 of the motor 10 is coupled to the gear 20a on the input side of the transmission 20.

The transmission 20 changes high rotation/low torque input from the motor 10 to convert the high rotation/low torque into, for example, low rotation/high torque and output the low rotation/high torque. The differential device 14 includes a differential gear 24, to which the gear 20b on the output side of the transmission 20 is connected. Thus, the reduced output from the transmission 20 is input to the differential device 14.

As described above, the driving force of the motor 10 is transmitted to the differential device 14 through the transmission 20. The differential device 14 transmits the driving force input from the gearbox 12 to the pared left and right of drive shafts 16L and 16R, and then to unillustrated wheels through paired left and right output shafts at a predetermined ratio in accordance with a travel state of the vehicle. This enables the vehicle to travel.

The motor 10, the transmission 20, and the differential device 14 are housed in a drive unit housing 25 constituting the drive unit 8, and are integrally configured as the drive unit 8. The drive unit housing 25 is supported, at its motor-side end region, by the two couplers 28a and 28b constituting a motor-side support 28 to be coupled to the cross member 6F constituting the ladder frame 2. To be more specific, the cross member 6F is coupled to support members 7L and 7R extending downward in a vehicle height direction Z from the cross member 6F, and the support members 7L and 7R are coupled to the couplers 28a and 28b. The drive unit housing 25 is supported by, at its differential-side end region, by the two couplers 29a and 29b constituting a differential-side support 29 to be coupled to the cross member 6R that constitutes the ladder frame 2. As thus described above, the drive unit housing 25 is coupled to the couplers 28a and 28b, the couplers 29a and 29b, and the cross members 6F and 6R, thereby supporting the vehicle drive apparatus 1 below the ladder frame 2 in the vehicle height direction Z. The two couplers 28a and 28b of the motor-side support 28 are located at the same positions with respect to the vehicle front-and-rear direction Y. That is, a virtual line (long dashed short dashed line of FIG. 3) connecting the two couplers 28a and 28b is parallel to the vehicle width direction X. The two couplers 29a and 29b of the differential-side support 29 are located at the same positions with respect to the vehicle front-and-rear direction Y. That is, a virtual line (long dashed short dashed line of FIG. 3) connecting the two couplers 29a and 29b is parallel to the vehicle width direction X. The couplers 28a' and 28b' indicated by a dotted line of FIG. 3 are couplers of a comparative example described later.

The two couplers 28a and 28b of the motor-side support 28 are arranged farther outside in the vehicle width direction X than the couplers 29a and 29b of the differential-side support 29, respectively. With reference to FIG. 3, when the couplers 28a and 29a are compared, the coupler 28a is arranged closer to the side rail 4L than the coupler 29a is, i.e., the coupler 28a is arranged farther outside in the vehicle width direction X as viewed from the vehicle center, i.e., the center between the side rails 4L and 4R. When the couplers 28b and 29b are compared, the coupler 28b is arranged closer to the side rail 4R than the coupler 29a is, i.e., the coupler 28b is arranged farther outside in the vehicle width direction X as viewed from the vehicle center, i.e., the center between the side rails 4L and 4R. Thus, virtual lines (long dashed short dashed lines of FIG. 3) connecting the couplers 28a and 28b and the couplers 29a and 29b, respectively, form a trapezoid with the line between the two couplers 28a and 28b of the motor-side support 28 being a lower base and with the line between the two couplers 29a and 29b of the differential-side support 29 being an upper base in plan view from above the vehicle.

Further, the couplers 28a and 28b of the motor-side support 28 are arranged at lower positions in the vehicle height direction Z than the couplers 28a and 28b of the differential-side support 29, as illustrated in FIG. 2.

Configuration of Comparative Example

Figure 4:
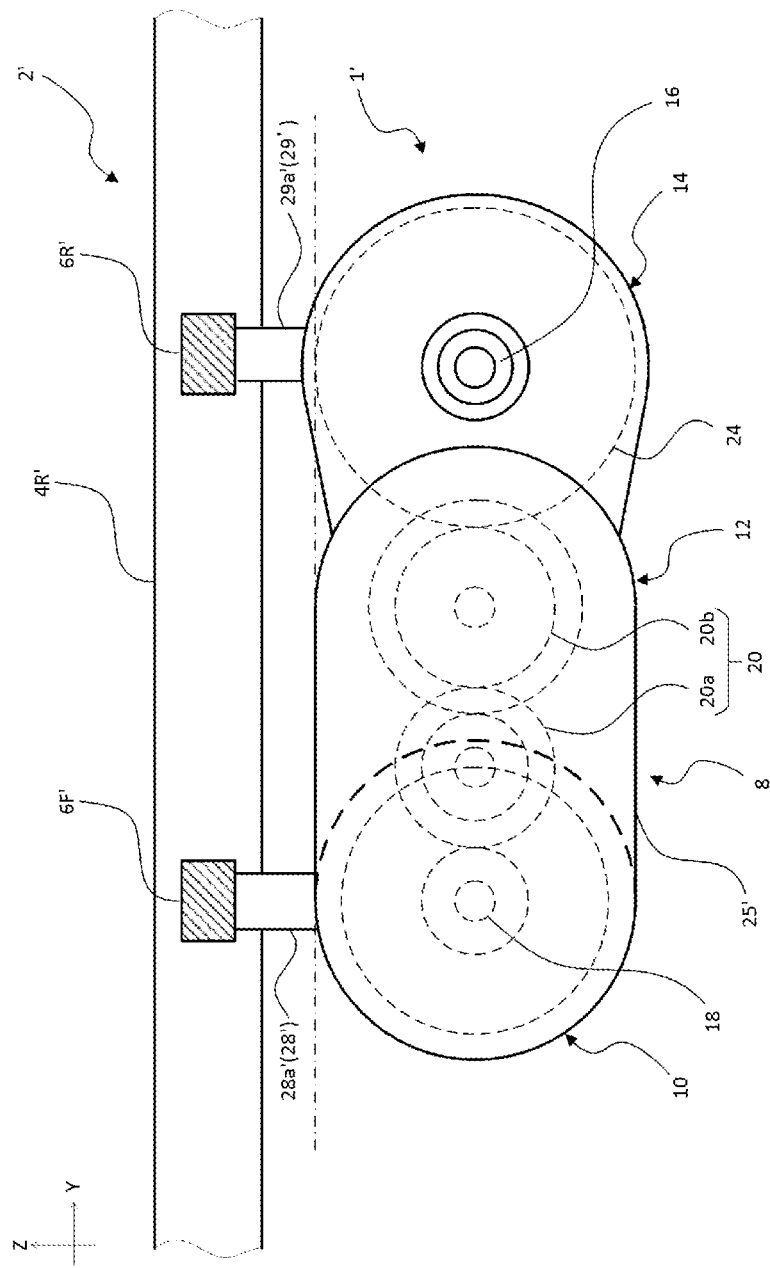
FIG. 4 is a view schematically illustrating a vehicle drive apparatus of a comparative example of the present invention viewed from the side of a vehicle.
Figure 5:
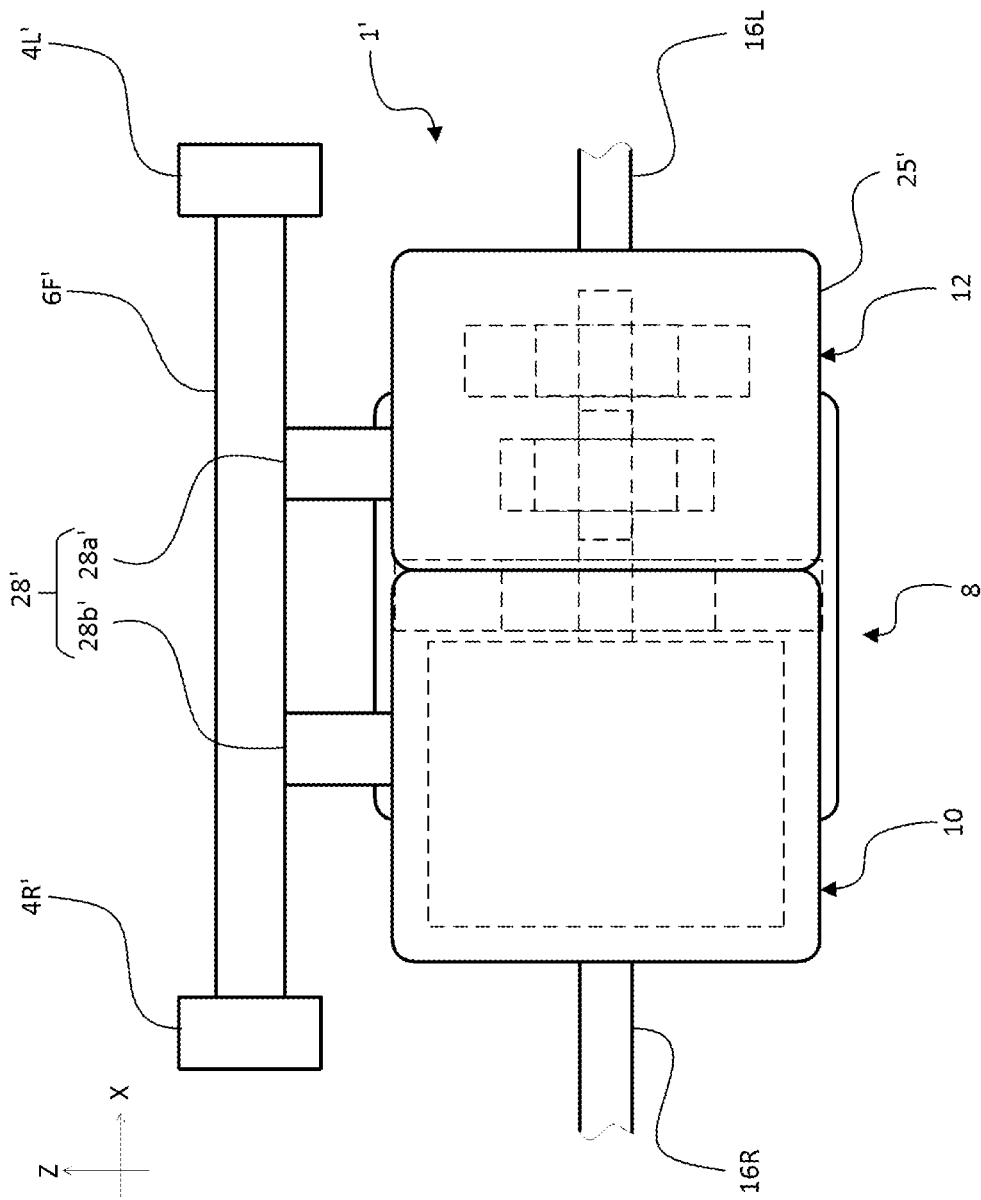
FIG. 5 is a view illustrating the vehicle drive apparatus of FIG. 4 viewed from the front of the vehicle.
Figure 6:
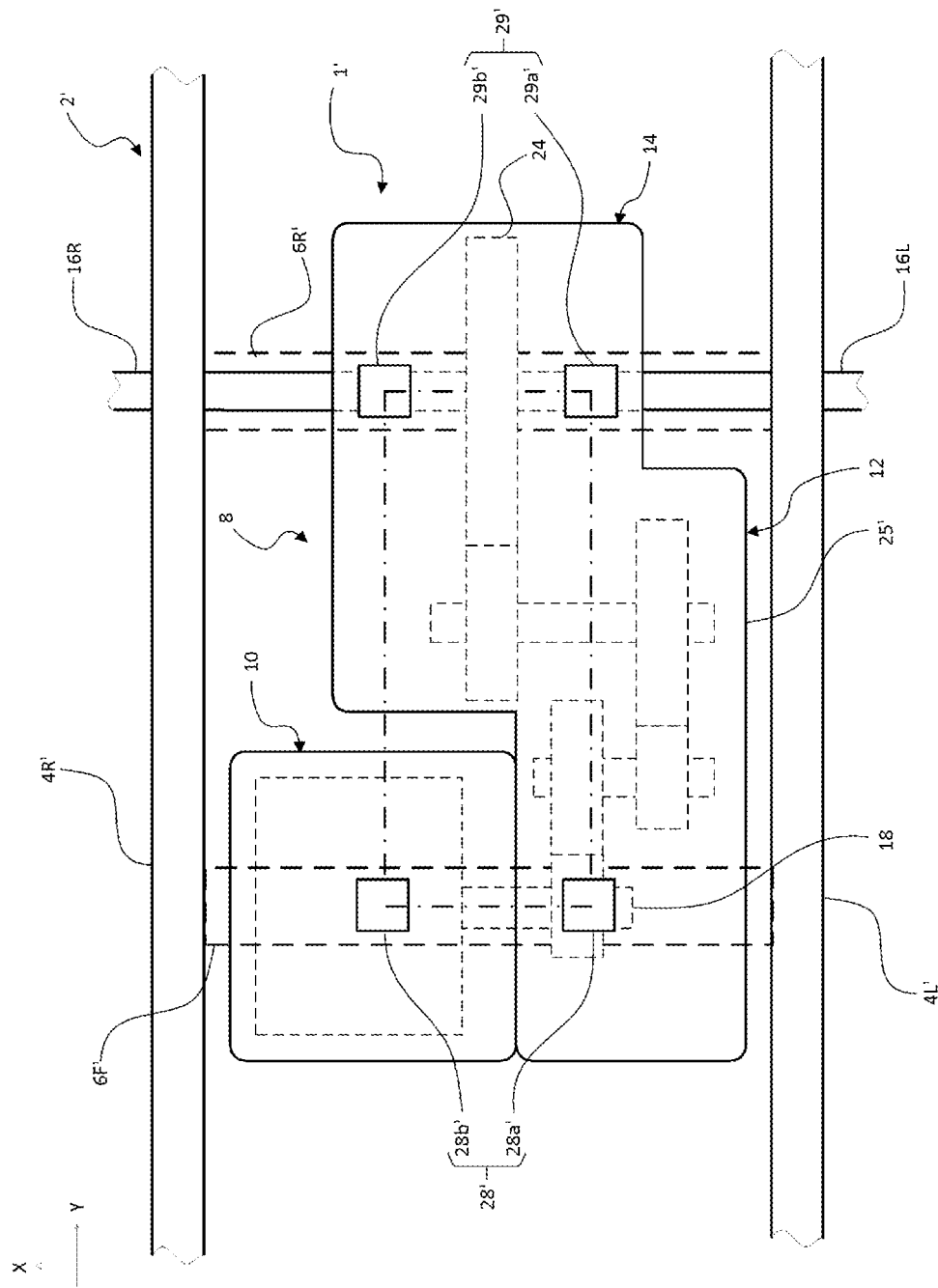
FIG. 6 is a view illustrating the vehicle drive apparatus of FIG. 4 viewed from above the vehicle.

Subsequently, the outline of a vehicle drive apparatus 1' of a comparative example of the present invention will be described with reference to FIGS. 4 to 6. The same components as those of the embodiment described above are indicated by the same reference signs to omit detailed description. Components having functions or the like corresponding to those of the above embodiment are indicated with '' added to the reference signs of the above embodiment. FIG. 4 is a view schematically illustrating the vehicle drive apparatus 1' of the comparative example of the present invention from the side of a vehicle. For convenience of explanation of features, FIG. 4 employs a viewpoint illustrating, of a pair of side rails 4L' and 4R', only a side rail 4R' located on the back side in lateral view. FIG. 5 is a view illustrating the vehicle drive apparatus 1' from the front of the vehicle. FIG. 6 is a view illustrating the vehicle drive apparatus 1' from above the vehicle.

The drive unit housing 25' is supported, at its motor-side end region, by the two couplers 28a' and 28b' constituting a motor-side support 28' to be coupled to the cross member 6F' constituting the ladder frame 2'. The drive unit housing 25' is supported by, at its differential-side end region, by the two couplers 29a' and 29b' constituting a differential-side support 29' to be coupled to the cross member 6R' that constitutes the ladder frame 2'. As thus described above, the drive unit housing 25' is coupled to the couplers 28a' and 28b', the couplers 29a' and 29b', and the cross members 6F' and 6R', thereby supporting the vehicle drive apparatus 1 on the ladder frame 2'.

The two couplers 28a' and 28b' of the motor-side support 28' are arranged at the same positions with respect to the vehicle width direction X as the couplers 29a' and 29b' of the differential-side support 29', respectively. Thus, virtual lines (long dashed short dashed lines of FIG. 6) connecting the couplers 28a' and 28b' and the couplers 29a' and 29b', respectively, form a trapezoid with the line between the two couplers 28a' and 28b' of the motor-side support 29 being a lower base and with the line between the two couplers 29a' and 29b' of the differential-side support 29 being an upper base in plan view from above the vehicle shown in FIG. 6.

Further, the couplers 28a' and 28b' of the motor-side support 28 are arranged at lower positions in the vehicle height direction Z than the couplers 29a' and 29b' of the differential-side support 29, as illustrated in FIG. 5.

Comparison Between Embodiment and Comparative Example

Next, the comparison between the embodiment and the comparative example described above will be described.

When the vehicle rolls or pitches during travel, a larger moment is produced in the drive unit 8 that is a heavy object. Thus, the moment produced in the drive unit 8 is input to the ladder frame 2 (the ladder frame 2' of the comparative example) through the couplers 28a and 28b (the couplers 28a' and 28b' of the comparative example) and the couplers 29a and 29b (the couplers 29a' and 29b' of the comparative example). The rolling and pitching of the drive unit 8 are desired to be in phase with the rolling and pitching of the vehicle from the viewpoint of travel stability. However, if the couplers 28a and 28b (the couplers 28a' and 28b' of the comparative example) and the couplers 29a and 29b (the couplers 29a' and 29b' of the comparative example) have low attachment rigidity, it causes the rolling and pitching of the drive unit 8 and the rolling and pitching of the vehicle to be out of phase with each other, thereby lowering the travel stability. The term "rolling" means the side-to-side motion of the vehicle about an axis in the vehicle front-and-rear direction Y, and the term "pitching" means the front-rear motion of the vehicle about an axis in the vehicle width direction X.

In the configuration of the embodiment, the two couplers 28a and 28b of the motor-side support 28 are arranged farther outside in the vehicle width direction X than the couplers 29a and 29b of the differential-side support 29, respectively. In contrast, in the configuration of the comparative example, the two couplers 28a' and 28b' of the motor-side support 28' are arranged at the same positions with respect to the vehicle width direction X as the couplers 29a' and 29b' of the differential-side support 29', respectively.

The rolling of the drive unit 8 accompanying the rolling of the vehicle will now be discussed. When the vehicle rolls, the drive unit 8 also rolls. The drive unit housing 25 housing the drive unit 8 of the embodiment has a larger distance in the vehicle width direction X between the couplers 28a and 28b that constitute the motor-side support 28 near the motor 10, which is a heavy object, than in the case of the comparative example. That is, the couplers 28a and 28b are arranged farther from the center of rolling that is the center of gravity of the drive unit 8. Thus, the couplers 28a and 28b receive a smaller moment during the rolling of the drive unit 8. This makes it possible to reduce the requirement of rigidity on the couplers 28a and 28b, thereby enabling the drive unit 8 to be supported on the ladder frame 2 while reducing increase in size and weight of the couplers 28a and 28b, which are support devices. Consequently, the stability of the drive unit 8 during the rolling of the vehicle can be improved.

When the vehicle rolls, the drive unit housing 25 housing the drive unit 8 in the embodiment moves about an axis (long dashed short dashed line of FIG. 1) connecting the motor-side support 28 and the differential-side support 29 in lateral view of FIG. 1. In the comparative example, an axis (long dashed short dashed line of FIG. 4) connecting the motor-side support 28' and the differential-side support 29' is located above the drive unit housing 25' in the vehicle height direction Z. Thus, the drive unit 8, which is a heavy object, tends to move strongly during the rolling of the vehicle. In contrast, in the embodiment, the motor-side support 28 is arranged at the lower position in the vehicle height direction Z than the differential-side support 29. Thus, the axis (long dashed short dashed line of FIG. 1) connecting the motor-side support 28 and the differential-side support 29 passes through the inside of the drive unit housing 25. The motor-side support 28 is also provided close to the center of gravity of the motor 10, which is a heavy object of the components of the drive unit 8. That is, the axis (long dashed short dashed line of FIG. 1) connecting the motor-side support 28 and the differential-side support 29 passes close by the center of gravity of the drive unit 8. This makes it possible to reduce the requirement of rigidity on the couplers 28a and 28b, thereby enabling the drive unit 8 to be supported on the ladder frame 2 while reducing increase in size and weight of the couplers 28a and 28b, which are support devices. Consequently, the stability of the drive unit 8 during the rolling of the vehicle can be improved.

Additionally, the motor 10 is a heavy object of the components of the drive unit 8 as described above, thereby causing the motor-side end region and the differential-side end region of the drive unit housing 25 to move differently during the rolling of the drive unit 8. This may result in large rolling of the motor-side end region. In the comparative example, the virtual line (long dashed short dashed line of FIG. 6) connecting the couplers 28a' and 28b' and the couplers 29a' and 29b' forms the rectangle with the line between the two couplers 28a and 28b of the motor-side support 28 being the lower side and with the line between the two couplers 29a and 29b of the differential-side support 29 being the upper side in plan view from above the vehicle of FIG. 6. In contrast, in the embodiment, the virtual line (long dashed short dashed line of FIG. 3) connecting the couplers 28a and 28b and the couplers 29a and 29b forms the trapezoid that is line symmetric in the vehicle width direction X (a line-symmetric axis: extending in the vehicle front-and-rear direction Y) with the line between the two couplers 28a and 28b of the motor-side support 28 being the lower base and with the line between the two couplers 29a and 29b of the differential-side support 29 being the upper base in plan view from above the vehicle of FIG. 3.

As described above, arranging the four couplers, i.e., the couplers 28a and 28b of the motor-side support 28 and the couplers 29a and 29b of the differential-side support 29 such that the virtual line connecting the four couplers forms the trapezoid in plan view from above the vehicle can improve the roll performance of the vehicle as a whole. To be more specific, the roll axial centers of the drive apparatus and the vehicle, which are separate mass bodies independent of each other, need to correspond to each other as much as possible in order to improve the roll performance of the vehicle as a whole. Hence, as shown in FIG. 3, arranging the four couplers such that the two couplers 28a and 28b have the equal lengths L in the vehicle width direction X, which are larger than those of the comparative example, allows the roll axial centers of the drive apparatus and the vehicle to easily correspond to each other, and the roll performance of the entire vehicle to be improved.

Subsequently, the pitching of the drive unit 8 accompanying the pitching of the vehicle will be discussed. When the vehicle pitches, the drive unit 8 also pitches. The drive unit housing housing the drive unit 8 of the embodiment has a larger distance in the vehicle front-and-rear direction Y between the couplers 28a and 28b constituting the motor-side support 28 near the motor 10, which is a heavy object, and the couplers 29a and 29b constituting the differential-side support 29 than in the case of the comparative example. That is, the couplers 28a and 28b are arranged farther from the center of pitching that is the center of gravity of the drive unit 8. Thus, the couplers 28a and 28b receive a smaller moment during the pitching of the drive unit 8. This makes it possible to reduce the requirement of rigidity on the couplers 28a and 28b, thereby enabling the drive unit 8 to be supported on the ladder frame 2 while reducing increase in size and weight of the couplers 28a and 28b, which are support devices. Consequently, the stability of the drive unit 8 during the pitching of the vehicle can be improved.

Subsequently, torque reaction in excitation of the motor 10 will be discussed. When the motor 10 is excited, the rotary shaft 18 rotates to transmit the rotation to the differential gear 24 of the differential device 14 through the transmission 20, thereby rotating the wheels via the pair of drive shafts 16L and 16R. At this point, reaction from the road surface against the rotation of the wheels produces, in the drive unit 8, a rotating moment about the drive shafts 16L and 16R. The distance from the axis of the drive shafts 16L and 16R to the couplers 28a and 28b of the motor-side support 28 of the embodiment is larger than the distance to the couplers 28a' and 28b' of the motor-side support 28' of the comparative example. That is, the rotating moment acting on the drive unit 8 can be supported at a farther position. This allows the drive unit 8 to be supported on the ladder frame 2 while reducing increase in size and weight of the couplers 28a and 28b of the motor-side support 28 of the embodiment, and makes it possible to improve the stability of the drive unit 8 during the driving of the motor 10.

As described above, the vehicle drive apparatus 1 of the present embodiment includes the drive unit including the motor 10 for generating a driving force in the vehicle having the ladder frame 2, the transmission 20 for changing the driving force transmitted from the motor 10, and the differential device 14 for splitting the driving force transmitted from the transmission 20 and transmitting the forces split to the driving wheels of the vehicle. The vehicle drive apparatus 1 further includes the drive unit housing 25 that houses the drive unit 8 at least partly, the motor-side support 28 coupling the drive unit housing 25 to the ladder frame 2 by the two couplers arranged in the motor-side end region of the drive unit housing 25, and the differential-side support 29 coupling the drive unit housing 25 to the ladder frame 2 in the differential-side end region of the drive unit housing 25. The two couplers 28a and 28b of the motor-side support 28 are arranged farther outside in the vehicle width direction X than the differential-side support 29.

As compared to a vehicle drive apparatus without such a configuration, the two couplers 28a and 28b are arranged farther from the center of rolling that is the center of gravity of the drive unit 8. Thus, it is possible to make couplers 28*a* and 28*b* receive a smaller moment during the rolling of the drive unit 8. This makes it possible to reduce the requirement of rigidity on the couplers 28*a* and 28*b*, thereby enabling the drive unit 8 to be supported on the ladder frame 2 while reducing increase in size and weight of the couplers, which are support devices. Consequently, the stability of the drive unit 8 during the rolling of the vehicle can be improved.

The two couplers 28*a* and 28*b* of the motor-side support are arranged at the same positions with respect to the vehicle front-and-rear direction Y, and the virtual line connecting the two couplers 28*a* and 28*b* of the motor-side support 28 is parallel to the vehicle width direction X. Thus, the two couplers 28*a* and 28*b* receive equal forces. This makes it possible to reduce the requirement of rigidity on the two couplers 28*a* and 28*b*, thereby reducing increase in size and weight of the couplers 28*a* and 28*b*.

The differential-side support 29 couples the drive unit housing 25 to the cross member 6R of the ladder frame 2 by the two couplers 29*a* and 29*b* arranged in the differential-side end region of the drive unit housing 25. As compared to when only one coupler is employed, employing the two couplers 29*a* and 29*b* as the differential-side support 29 can reduce stress concentration, thereby making it possible to reduce the requirement of rigidity on the couplers 29*a* and 29*b*, and to reduce increase in size and weight of the couplers 29*a* and 29*b*.

The two couplers 28*a* and 28*b* of the motor-side support 28 and the two couplers 29*a* and 29*b* of the differential-side support 29 are arranged such that the virtual line connecting the two couplers 28*a* and 28*b* and the two couplers 29*a* and 29*b* forms the trapezoid that is line symmetric in the vehicle width direction with the line between the two couplers of the motor-side support 28 being the lower base in plan view from above the vehicle. As described above, arranging the four couplers, i.e., the couplers 28*a* and 28*b* of the motor-side support 28 and the couplers 29*a* and 29*b* of the differential-side support 29 such that the virtual line connecting the four couplers forms the trapezoid in plan view from above the vehicle can improve the roll performance of the vehicle as a whole. To be more specific, the roll axial centers of the drive apparatus and the vehicle, which are separate mass bodies independent of each other, need to correspond to each other as much as possible in order to improve the roll performance of the vehicle as a whole. Hence, as shown in FIG. 3, arranging the four couplers such that the two couplers 28*a* and 28*b* have the equal lengths L in the vehicle width direction X, which are larger than those of the comparative example, allows the roll axial centers of the drive apparatus and the vehicle to easily correspond to each other, and the roll performance of the entire vehicle to be improved.

The motor-side support 28 is arranged at the lower position in the vehicle height direction Z than the differential-side support 29. Thus, the axis connecting the motor-side support 28 and the differential-side support 29 passes through the inside of the drive unit housing 25. This makes it possible to reduce the requirement of rigidity on the couplers 28*a* and 28*b* of the motor-side support 28, thereby enabling the drive unit to be supported on the support members 7L and 7R extending from the cross member 6F of the ladder frame 2 while reducing increase in size and weight of the couplers 28*a* and 28*b*, which are support devices. Consequently, the stability of the drive unit 8 during the rolling of the vehicle can be improved.

Although the differential-side support 29 is composed of the two couplers 29*a* and 29*b* in the above embodiment, the differential-side support 29 may be composed of one coupler as a combination of the couplers 29*a* and 29*b*.

Configuration of Another Embodiment

Figure 7:
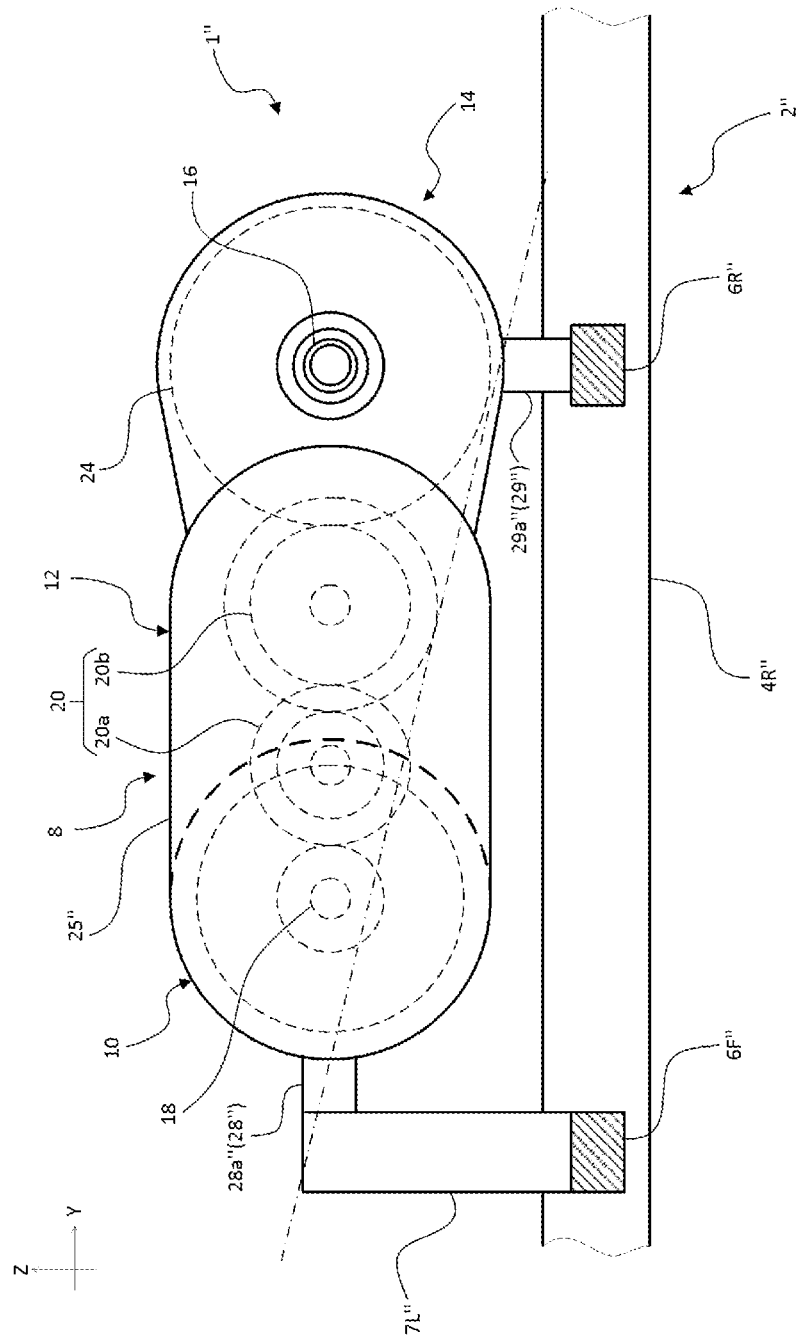
FIG. 7 is a view schematically illustrating a vehicle drive apparatus of another embodiment of the present invention viewed from the side of a vehicle.
Figure 8:
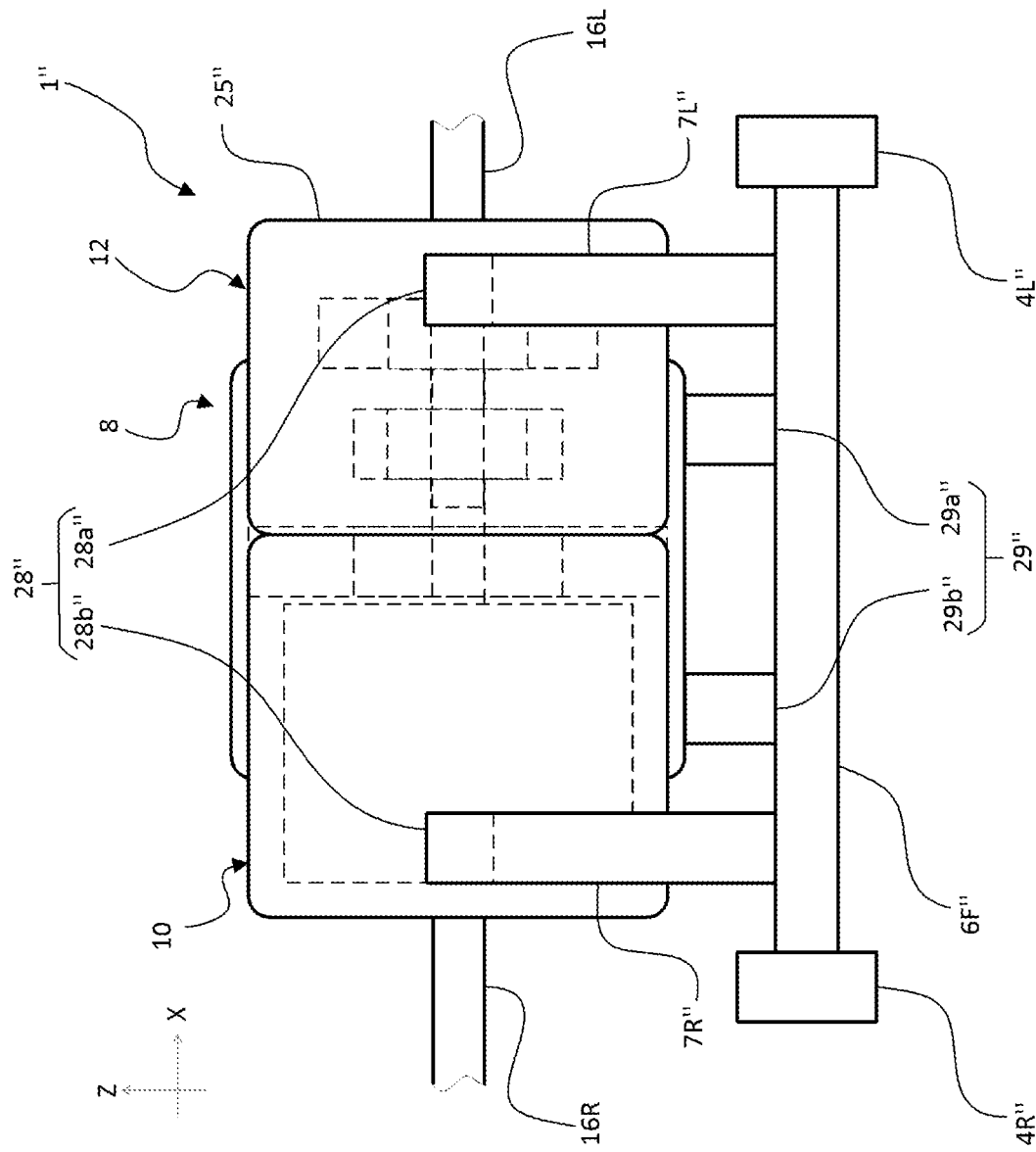
FIG. 8 is a view illustrating the vehicle drive apparatus of FIG. 7 viewed from the front of the vehicle.
Figure 9:
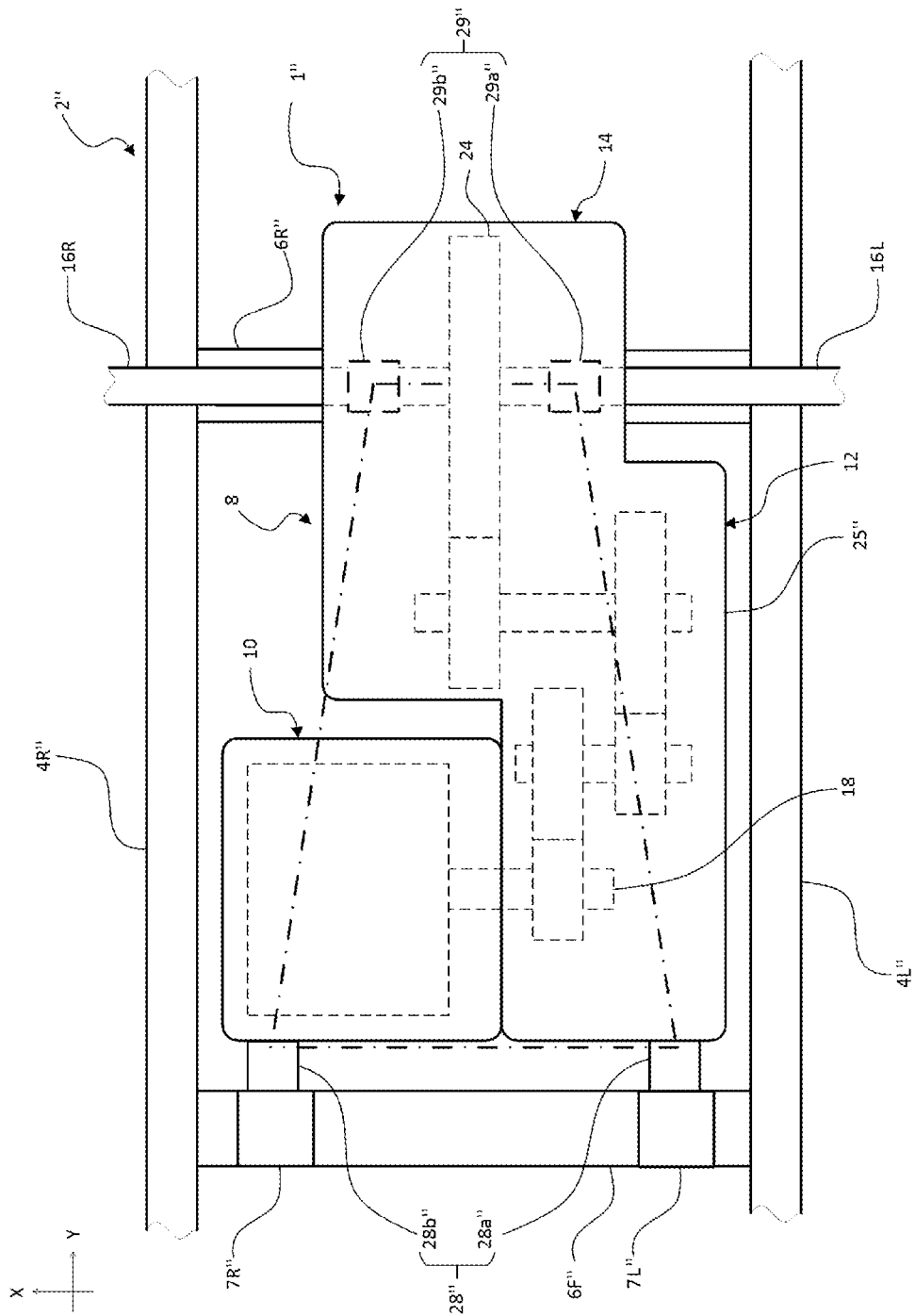
FIG. 9 is a view illustrating the vehicle drive apparatus of FIG. 7 viewed from above the vehicle.

Next, an outline of a vehicle drive apparatus 1" according to another embodiment of the present invention will be described with reference to FIGS. 7 to 9. The same components as those of the embodiment described above are indicated by the same reference signs to omit detailed description. Components having functions or the like corresponding to those of the above embodiment are indicated with "added to the reference signs of the above embodiment. FIG. 7 is a view schematically illustrating the vehicle drive apparatus 1" of the other embodiment of the present invention from the side of a vehicle. For convenience of explanation of features, FIG. 7 employs a viewpoint illustrating, of a pair of side rails 4L" and 4R" described later, only a side rail 4R" located on the back side in lateral view. FIG. 8 is a view illustrating the vehicle drive apparatus 1" from the front of the vehicle. FIG. 9 is a view illustrating the drive apparatus 1" from above the vehicle.

The drive unit housing 25' is supported, at its motor-side end region, by the two couplers 28*a*' and 28*b*' constituting a motor-side support 28' to be coupled to the cross member 6F" constituting the ladder frame 2'. To be more specific, support members 7L" and 7R" extending upward from the cross member 6F" in the vehicle height direction Z are coupled to the cross member 6F", and the couplers 28*a*" and 28*b*" are coupled to the support members 7L" and 7R". The drive unit housing 25' is supported by, at its differential-side end region, by the two couplers 29*a*' and 29*b*' constituting a differential-side support 29' to be coupled to the cross member 6R' that constitutes the ladder frame 2'. The drive unit housing 25" is coupled to the couplers 28*a*" and 28*b*", the couplers 29*a*" and 29*b*", and the cross members 6F and 6R as described above, thereby supporting the vehicle drive apparatus 1" above the ladder frame 2" in the vehicle height direction Z.

The two couplers 28*a* and 28*b* of the motor-side support 28 are arranged farther outside in the vehicle width direction X than the couplers 29*a* and 29*b* of the differential-side support 29, respectively. With reference to FIG. 9, when the couplers 28*a*" and 29*a*" are compared, the coupler 28*a*" is arranged closer to the side rail 4L" than the coupler 29*a*" is, i.e., the coupler 28*a*" is arranged farther outside in the vehicle width direction X as viewed from the vehicle center, i.e., the center between the side rails 4L" and 4R". Similarly, when the couplers 28*b*" and 29*b*" are compared, the coupler 28*b*" is arranged closer to the side rail 4R" than the coupler 29*a*" is, i.e., the coupler 28*b*" is arranged farther outside in the vehicle width direction X as viewed from the vehicle center, i.e., the center between the side rails 4L" and 4R". Thus, a virtual line (long dashed short dashed line of FIG. 9) connecting the couplers 28*a*" and 28*b*" and the couplers 29*a*" and 29*b*" forms a trapezoid with the line between the two couplers 28*a*" and 28*b*" of the motor-side support 28" being a lower base, and the line between the two couplers 29*a*" and 29*b*" of the differential-side support 29" being an upper base in plan view from above the vehicle.

The couplers 28*a*" and 28*b*" of the motor-side support 28" are also arranged at higher positions in the vehicle height direction Z than the couplers 28*a*" and 28*b*" of the differential-side support 29" as illustrated in FIG. 8.

In the vehicle drive apparatus 1" of the other embodiment of the present invention, the drive unit 8 is arranged above the ladder frame 2" in the vehicle height direction Z as described above. As illustrated in FIGS. 7 and 8, the motor-side support 28" of the vehicle drive apparatus 1" of the other embodiment of the present invention is arranged at the higher position in the vehicle height direction Z than the differential-side support 29". When the vehicle rolls, the drive unit housing 25" housing the drive unit 8 moves about an axis connecting the motor-side support 28" and the differential-side support 29" in lateral view of FIG. 7 in the embodiment. The motor-side support 28" is arranged at the higher position in the vehicle height direction Z than the differential-side support 29". Thus, the axis (long dashed short dashed line in FIG. 7) connecting the motor-side support 28" and the differential-side support 29" passes through the inside of the drive unit housing 25". The motor-side support 28 is also arranged close to the center of gravity of the motor 10, which is a heavy object of the components of the drive unit 8. That is, the axis (long dashed short dashed line in FIG. 7) connecting the motor-side support 28" and the differential-side support 29" passes close by the center of gravity of the drive unit 8. This makes it possible to reduce the requirement of rigidity on the couplers 28a" and 28b", thereby enabling the drive unit 8 to be supported on the ladder frame 2" while reducing increase in size and weight of the couplers 28a" and 28b", which are support devices. Consequently, the stability of the drive unit 8 during the rolling of the vehicle can be improved even when the drive unit 8 is arranged above the ladder frame 2" in the vehicle height direction Z.

Although the above embodiments have been described by using the electric truck having only the motor 10 as the driving source for travel as an example, the vehicle drive apparatus 1 is also applicable in a hybrid electric truck that uses an internal combustion engine as well as the motor 10. The vehicle drive apparatus 1 is not limited to the electric trucks but is also applicable in general commercial vehicles having the motor 10.

Although the drive unit housing 25 houses the drive unit 8 in the above embodiments, the drive unit housing 25 may partly house the drive unit 8.

Although the drive unit housing 25 houses the drive unit 8 in the above embodiments, the drive unit housing 25 may house part of the drive unit 8.

Although the above embodiments have been described by using the drive unit 8 having the transmission 20 as an example, the drive unit 8 according to the present invention may be a drive unit including a multi-stage transmission.

Although the embodiments of the present invention have been described above, the present invention may be carried out in various other forms. The embodiments and variations are included in the scope and spirit of the invention, as well as in the invention of claims and the equivalents thereof.

1 Vehicle Drive Apparatus
2 Ladder Frame
4L, 4R Side Rail
6F, 6R Cross Member
7L, 7R Support Member
8 Drive Unit
10 Motor
14 Differential Device
16L, 16R Drive Shaft
18 Rotary Shaft
20 Transmission
20a, 20b Transmission Gear
24 Differential Gear
25 Drive Unit Housing
28 Motor-side Support
28a, 28b Coupler
29 Differential-side Support
29a, 29b Coupler

The invention claimed is:

1. A vehicle drive apparatus having a drive unit, wherein the drive unit includes: a motor that generates a driving force in a vehicle with a ladder frame; a transmission that changes the driving force transmitted from the motor; and a differential that splits the driving force transmitted from the transmission and transmits forces split to driving wheels of the vehicle, the vehicle drive apparatus comprising:
   a drive unit housing that houses at least part of the drive unit;
   a motor-side support coupling the drive unit housing to the ladder frame by two couplers arranged in a motor-side end region of the drive unit housing; and
   a differential-side support coupling the drive unit housing to the ladder frame in a differential-side end region of the drive unit housing,
   the two couplers of the motor-side support being arranged father outside in a vehicle width direction than the differential-side support;
   wherein the differential-side support couples the drive unit housing to the ladder frame by two couplers arranged in the differential-side end region of the drive unit housing;
   wherein the two couplers of the motor-side support and the two couplers of the differential-side support are arranged such that a virtual line connecting the two couplers of the motor-side support and the two couplers of the differential-side support forms a trapezoid that is line symmetric in the vehicle width direction with a line between the two couplers of the motor-side support being a lower base in plan view from above the vehicle.

2. The vehicle drive apparatus of claim 1, wherein a virtual line connecting the two couplers of the motor-side support is parallel to the vehicle width direction.

3. The vehicle drive apparatus of claim 1, wherein the motor-side support is arranged at a lower position in a vehicle height direction than the differential-side support.

4. The vehicle drive apparatus of claim 1, wherein the motor-side support is arranged at a higher position in a vehicle height direction than the differential-side support.

* * * * *